Patented Oct. 25, 1927.

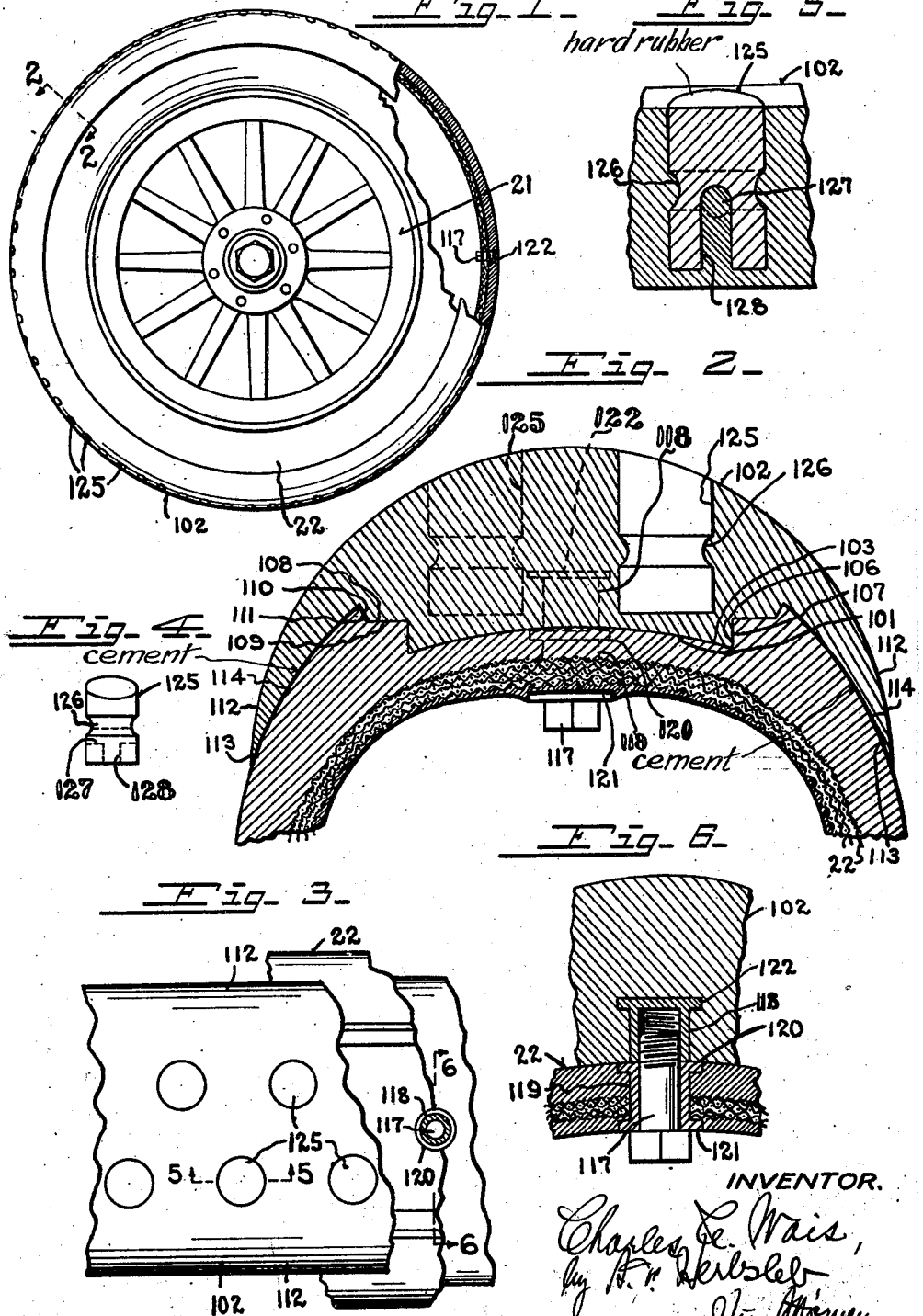

1,646,508

UNITED STATES PATENT OFFICE.

CHARLES C. WAIS, OF CINCINNATI, OHIO, ASSIGNOR OF ONE-HALF TO ALBERT C. WAIS, OF WYOMING, OHIO.

VEHICLE WHEEL.

Application filed August 12, 1920. Serial No. 403,090.

It is the object of my invention to provide a cushion tread for a vehicle wheel embodying novel traction resistant plugs; further, to provide such traction resistant plugs in a traction tread; further, to provide novel formations and connecting means between an annular traction-tread and a casing about which said traction-tread is received; and, further, to provide novel connecting means between the traction-tread and the casing.

The invention will be further readily understood from the following description and claims, and from the drawings, in which latter:

Fig. 1 is a side elevation of a vehicle wheel, partly broken away, embodying my invention.

Fig. 2 is an enlarged cross-section, taken on the line 2—2 of Fig. 1, exemplifying my invention.

Fig. 3 is a plan detail of my improved device, partly broken away.

Fig. 4 is a side elevation of one of the traction plugs.

Fig. 5 is an axial section of the same, shown imbedded in the tire, taken on the line 5—5 of Fig. 3; and, Fig. 6 is a detail of the securing means for the shoe, taken in the plane of the line 6—6 of Fig. 3.

21 represents the body of the vehicle wheel. 22 represents the casing. The casing is received about the body of the vehicle wheel and is confined thereon by any of the usual well-known fastening means, exemplified as a detachable demountable mechanism.

In the present exemplification of my invention, the outer annular portion of the casing is provided with an annular groove 101. An annular tread 102 is provided with an annular tongue 103 received in the annular groove. The bottom wall of the annular groove is preferably curved outwardly in cross-section, the tongue being provided with a coincident cross-sectional outwardly extending recess. The tongue and groove are also preferably provided with annular shoulders 106, 107, annular steps 108, 109, and annular shoulders 110, 111, the latter shoulders preferably slanting outward.

The tread is preferably provided with annular flaps 112, at its respective sides, reaching radially over the outer portion of the casing. The inner faces of the flaps conform in form to the outer faces of the casing over which the flaps extend. The flaps are preferably tapered at their outer edges, as shown at 113, to form thin edges. The flaps are preferably fixed to the casing, being for instance cemented to the outer face of the casing, as indicated at 114.

If desired, the tread may be additionally secured to the casing by bolts 117 and nuts 118, which may be arranged at suitable distances apart, about the periphery of the casing, five or six of these bolts being preferably provided, although the number is immaterial. Each of the bolts is preferably received through a sleeve 119, which is provided with flanges 120, 121, respectively imbedded in the rubber of the casing, the bore of the sleeve communicating with the inside of the casing. The nut is preferably provided with a flange 122 being preferably closed at its outer end. The nut is imbedded in the rubber of the tread, there being preferably a considerable body of rubber extending radially outward from the nut.

The bolts are inserted through the sleeves and into the nuts from the inside of the casing or tire, and are readily releasable for renewal of the annular tread. My invention is particularly applicable to pneumatic tires which dispense with an inner tube of the character of that, for instance, shown, described and claimed in my copending application for Letters Patent of the United States on improvements in pneumatic tires for vehicle wheels, filed August 3, 1922, Serial No. 579,434.

Friction plugs 125 may, if desired, be imbedded in the tread-portion of the casing. They are shown imbedded in the tread. These friction plugs consist preferably of a friction composition, for instance vulcanized fibre, or harder rubber than the neighboring portions of the tread, for offering resistance to the yield of the rubber. The plugs are arranged to grip the surface over which the tire is traveling, so as to insure and enhance the tractive properties of the tire and prevent skidding. The plugs are provided with recesses into which the rubber may flow or be forced, so that the plugs are vulcanized into the rubber and have secure attachment thereto. These recesses are shown as annular grooves 126 in the respective plugs located intermediate of the ends of the plugs. The rubber surrounding the plugs is received in these grooves for securing the plugs in place. Each of the plugs may also be provided with a cross-perforation 127, and an inner axial bore 128 connecting with the cross-perforation to form indentations, in which the rubber surrounding the plug is also received, for aiding in holding the plugs in place. The plugs are imbedded in and firmly secured to the casing.

Having thus fully described my invention, what I claim as new and desire to secure by Letters Patent, is:

1. A casing of a tire for a vehicle wheel comprising friction plugs imbedded in the tread-portion of said casing and vulcanized therein, said friction plugs and the body of said casing having coacting projections and recesses between them at the outer peripheries of said friction plugs intermediate of the ends of said friction plugs, and said friction plugs provided with transverse apertures at said recesses into which the body of said casing projects, and said friction plugs having greater wear-resistant properties than the imbedding portions of said tread-portion.

2. A casing of a tire for a vehicle wheel comprising a resilient imbedding portion, and friction plugs respectively provided with a peripheral recess, an axial hole and a cross perforation communicating with said hole, said friction plugs vulcanized in said imbedding portion with said imbedding portion located in said recess, said axial hole and said cross perforation.

3. A tire for a vehicle wheel comprising a casing and an annular traction-tread having a tongue and groove between them, and means for connecting said tread to said casing comprising nuts vulcanized in said tread, complemental sleeves vulcanized in said casing, and bolts received through said sleeves into said nuts from the inside of said casing.

4. A tire for a vehicle wheel comprising a casing and an annular traction-tread having a tongue and groove between them, and means for connecting said tread to said casing comprising nuts vulcanized in said tread, complemental sleeves vulcanized in said casing, and bolts received through said sleeves into said nuts from the inside of said casing, said casing provided at each side of said tongue and groove with an annular outwardly extending bead, said annular traction-tread provided at its inner periphery with annular grooves complemental to said beads, said annular traction-tread provided at each side thereof with an annular flap at the outside of said last-named annular grooves, and means for securing said flaps to said casing.

In testimony whereof, I have hereunto signed my name.

CHARLES C. WAIS.